United States Patent [19]
Deng et al.

[11] Patent Number: 5,397,387
[45] Date of Patent: Mar. 14, 1995

[54] FOOD MARKING JET INK

[75] Inventors: Godwin Deng, Schaumburg; Edithe R. Altares, Glendale Heights, both of Ill.

[73] Assignee: Videojet Systems International, Inc., Wood Dale, Ill.

[21] Appl. No.: 224,150

[22] Filed: Apr. 7, 1994

[51] Int. Cl.$^6$ ............... C09D 11/14; C09D 11/08
[52] U.S. Cl. ............... 106/26 R; 106/19 C; 106/19 E; 106/30 R
[58] Field of Search ............ 106/19 C, 19 E, 19 R, 106/26 R, 25 A, 30 R; 426/540, 383

[56] References Cited
U.S. PATENT DOCUMENTS
5,282,893  1/1994  Komiya .................... 106/20 R
5,318,617  6/1994  Nagasawa et al. ........... 106/19 A

OTHER PUBLICATIONS
WO92/14795, Part 73, Chapter 1, vol. 21 C.F.R., Sep. 1992.
S 172.615 of vol. 21 C.F.R. Chapter 1 (Apr. 1, 1988 Edition).
S 172.868 of vol. 21 C.F.R. Chapter 1 (Apr. 1, 1988 Edition).

*Primary Examiner*—Helene Klemanski
*Attorney, Agent, or Firm*—Leydig, Voit & Mayer, Ltd.

[57] ABSTRACT

The present invention provides an ink composition for use in printing on food items, especially fruits and vegetables, and a method of forming printed images on food items by use of such compositions. The compositions of the present invention comprise a colorant, a binder, such as a wood rosin resin, and a carrier, such as ethanol. The composition is also characterized as being MEK-free, as well as, acetone-free.

20 Claims, No Drawings

FOOD MARKING JET INK

FIELD OF THE INVENTION

The present invention relates to ink jet compositions, generally, and in particular to jet ink compositions that are especially useful for marking on food items, especially fruits and vegetables.

BACKGROUND OF THE INVENTION

Presently, most marking of information on food items, such as fruit, is done by use of direct contact printing or labeling with stickers. Both techniques present their own difficulties. Good print quality using direct contact printing is difficult to achieve when printing on nonuniform, irregular surfaces, as are presented when one attempts to print on oranges, apples, grapefruit, and the like. Placing labels on such fruits or vegetables can be difficult for the same reasons, and further requires the consumer to remove the label before consuming a food item, such as an apple, or the like.

It is often useful to place variable information on food items. One example of such a need, generally in the case of fruits or vegetables, or citrus fruit in particular, is the desire by suppliers to mark the fruit with the "Price Look-Up" (PLU) Code. This PLU code is important at the retail level for entering the proper price, based on fruit size. A quick, easy manner of placing such information on food items is presently desired. Also, desirable for brand recognition, is the ability to make images on the food item, as by ink printing a corporate logo or the like.

Ink jet printing would offer the advantage of increased speed of marking food products and the opportunity to put variable information on food items, such as fruits and vegetables.

Ink jet printing is a well-known technique by which printing is accomplished without contact between the printing device and the substrate on which the printed characters are deposited. Ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At this break-up point, the droplets are charged in accordance with digital data signals. These drops are then passed through an electrostatic field which adjusts the trajectory of each droplet. The droplets are either directed back to a gutter for recirculation or to a specific location on the substrate to create the desired character matrix.

In drop-on-demand systems, a droplet is expelled under pressure from a valve directly to a position on the substrate in accordance with the digital data signals. A droplet is not formed or expelled unless it is to be jetted to the substrate. Since drop-on-demand systems require no ink recovery, charging, or deflection, the system is much simpler than the continuous stream system.

A problem associated with the direct marking of food items, such as packaged fruit, however, is that the information on the fruit must remain readable under a variety of conditions and must be stable, even in the presence of moisture. Because packaged or boxed fruit is often subjected to changing temperature and humidity conditions during transport, the surface of the fruit can develop condensation or sweat. The printed information on the surface of the fruit must remain readable even under such temperature and humidity extremes and sudden changes therein. The appearance of the printed image must not bleed, disappear, fade, or transfer to other fruit placed in contact therewith, under any of the conditions and environmental changes that fruit may encounter. For example, FD&C Blue #1 (CI Number 42090) is a major colorant in making violet or blue citrus inks. However, its sensitivity to water makes a printed image formed therefrom on citrus "bleed" when condensation occurs without the proper added ingredients. This is true to varying degrees with all FD&C dyes, due to their water solubility.

To attempt to address this need for noncontact printing on fruits and vegetables, some have suggested the use of ink jet printing. The problem, however, has been that ink used in such a fashion must meet the aforementioned rigid requirements, but also must be capable of being printed by use of existing ink jet printing equipment. Further, the printed image must be of food grade quality, edible and compliant with all applicable regulatory requirements such as those set forth by the U.S. Food and Drug Administration in the Code of Federal Regulations (CFR). In PCT publication number WO92/14795 the use of certain ink jet formulations has been mentioned in which a necessary component of the ink is methyl ethyl ketone ("MEK"). However, the use of such a solvent for marking fruits or vegetables is not desirable because it is not deemed acceptable for such food contact and therefore does not comply with certain governmental regulations, such as the regulations in the CFR that relate to acceptable ingredients for making inks for marking fruits and vegetables (Part 73, Chapter 1, Volume 21 of the CFR).

The aforementioned PCT application also suggests the use of ink compositions that employ acetone in a mixture with water or an alkanol and/or an alkyl ester, for ink jet printing onto a foodstuff. A cellulosic material is used as a thickening and binding agent. The formulation may optionally contain shellac or a rosin ester or certain other film-forming resins. The PCT publication expressly states that problems related to precipitation of dyestuffs and spreading of printed messages were experienced when the alcohol content was beyond 50%. Although acetone may be a suitable alternative to make an ink, its high evaporation rate makes long-term printer operation a problem. This problem is caused by the requirement of accurately maintaining the solvent balance of the ink while running in the printer. The required make-up would need to be robust enough to keep the solvents in the ink properly in equilibrium. This is especially true if the ink were required to operate at different environmental conditions of temperature and humidity.

An ink using acetone and water as the carrier, as suggested in the PCT publication, that would operate at ambient conditions of temperature and humidity, is difficult to employ in practice. Such an ink is even more difficult to use if it includes an alcohol or combination of alcohols, because of the problems in designing a suitable make-up solvent. If alkyl esters are included or substituted for the alcohols in the ink (with acetone still present), the job becomes even more complicated. The elimination of acetone from the ink makes the creation of a make-up much simpler.

Accordingly, there remains a need for a high quality ink jet composition that can be used to print by ink jet printing onto the surfaces of fruits and vegetable items, that will fulfill the rigid requirements as discussed above and yet be suitable for such a food-contact use, and thus comply with the list of acceptable ingredients as provided by governmental authorities such as the U.S. FDA.

Such an ink must be capable of providing printed images with exceptionally good moisture resistance, while employing components that are suitable for food contact, such as FD&C water-soluble dyes.

SUMMARY OF THE INVENTION

Surprisingly, it has been discovered that it is not necessary to have acetone as part of the solvent or carrier medium for ink compositions to be applied to food items and that elimination of such a solvent provides an improved ink for such a purpose. The carrier of the present invention comprises ethanol, optionally in combination with a denaturing agent, such as methanol.

Additionally, it has been found that wood rosin resins, especially hydrogenated and highly hydrogenated wood rosin resins provide exceptional adhesion of the ink to the surface of citrus fruits.

The present invention thus provides an ink composition for use in jet printing on food items, especially fruits and vegetables, and a method of forming printed images on such food items by use of such compositions.

The compositions of the present invention comprise a colorant, a binder and a carrier. The composition is also characterized as being free of methyl ethyl ketone and acetone.

The binders may be comprised of a cellulose derivative that is soluble or dispersible in the carrier medium and/or at least one component selected from the group consisting of hydrogenated wood rosin, shellac, and ethylcellulose.

DETAILED DESCRIPTION OF THE PREFERRED EMBODIMENTS

The formulated jet inks of the present invention will exhibit the following characteristics: (1) a viscosity from about 1 to about 10 centipoise (cps) at 25° C., (2) an electrical resistivity from about 50 to about 2,500 ohms-cm$^{-1}$, (3) a sonic velocity from about 1,000 to about 1,700 m/sec., and (4) a surface tension below 30 dynes/cm.

The Carrier

The carrier of the present invention comprises a lower alcohol, such as ethanol. The lower alcohol may be a mixture of lower alcohols, such as the denatured alcohol SDA-3A (ethanol with 5% methanol added as denaturant), as is allowed by the U.S. FDA for this type of application. Thus, a preferred carrier comprises ethanol and a denaturing agent, typically methanol, and typically present in an amount of about 5%, based on the total combined weight of ethanol and methanol.

The carrier may also include an alkyl ester, preferably ethyl acetate. Water may also usually be present in the carrier. Deionized water is preferred, for reasons of purity. The ethyl acetate, if present, is usually present in an amount from about 5 to about 40 percent. The lower alcohol, usually ethanol or a mixture of ethanol and methanol, is typically present in an amount from about 5 to about 85 percent. The water, if present, is usually present in an amount from about 0.5 to about 5 percent.

All percentages expressed herein are percentages by weight, unless otherwise specified, and are based on the total weight of the ink composition unless stated otherwise.

The Colorant

The composition of the invention also contains an image—forming component which is soluble or dispersed in the solvent/carrier medium. The image forming component can be in any suitable form having regard to the purpose to which the image in the substrate is to be put. It is preferred that the colorant be one which forms a visible image on the substrate, for example a dyestuff or a pigment.

Useful colorants include the dyes: FD&C Blue #1; FD&C Blue #2; FD&C Green #3; FD&C Red #2; FD&C Red #3; FD&C Red #40; FD&C Yellow #5; FD&C Yellow #6. Also, Lakes (defined as aluminum salts of FD&C water soluble dyes) can be used. They are available in powder form or predispersed in a suitable liquid vehicle. The Lakes that are available are for FD&C Blue #1; FD&C Blue #2; FD&C Red #3; FD&C Red #40; FD&C Yellow #5; FD&C Yellow #6. Colorants from the Generally Recognized As Safe ("GRAS") List or specified in Part 73 of Volume 21, C.F.R. Chapter 1 are especially preferred. "Natural" colorants obtained from plants or extracts of insects, are also suitable. Preferably, the colorant is a water-soluble dye.

The colorant is usually present in an amount from about 0.1% to about 20% by weight of the ink composition, with an amount of from about 0.5 to about 1.5% being preferred.

Binder Resin

As indicated, the binder resin of the present invention preferably comprises a rosin resin, more preferably a wood rosin resin, and most preferably a hydrogenated wood rosin resin. The most preferred hydrogenated wood rosin resin is one that is characterized as being highly hydrogenated, such as that sold by Hercules Incorporated under the trademark Foral® AX.

The rosins or rosin derivatives that may be used include those listed in § 172.615 of 21 CFR. Those include glycerol esters of partially dimerized rosin, glycerol esters of partially hydrogenated gum or wood rosin, glycerol esters of polymerized rosin, glycerol esters of tall oil rosin, glycerol esters of wood rosin, partially hydrogenated methyl esters of rosin, and pentaerythritol esters of partially hydrogenated gum or wood resin.

In another embodiment, the binder may comprise a cellulose derivative, preferably ethyl cellulose, along with shellac and/or a wood rosin resin. The wood rosin may be a wood rosin or a hydrogenated wood rosin. The preferred ethyl cellulose is described in Section 172.868 of Chapter 1 of Volume 21 C.F.R.

Other film-forming resins also may be used to add adhesion of the ink droplet to the substrate and to provide a measure of protection to the dried droplet against abrasion and the action of water or other solvents contacting the dried droplet. Any material that is capable of acting as a binder from Part 184, Chapter 1, 21 CFR—direct food substances affirmed as generally recognized as safe (GRAS List) may be employed. Such resins can be used only in food grade forms.

In accordance with the present invention, then, it is possible to use a rosin resin as the only binder, preferably a wood rosin resin. Most preferably, the wood rosin resin is hydrogenated. The wood rosin resin is preferably present in an amount from about 2 to about 25 percent based on the total weight of the ink composition.

The film-forming cellulose derivative, preferably ethylcellulose, when present, is usually present in an amount from about 0.2 to about 10 percent.

Shellac may be used in combination with the cellulose derivative alone as the binder, or in combination with the rosin resin alone, as the binder. Alternatively, shellac may be used in combination with both the cellulose derivative and the rosin resin, especially with ethyl cellulose and wood rosin resin, preferably hydrogenated wood rosin resin.

The Humectant

As stated above, the humectant prevents the ink jet tip from drying, and the nozzle/valve from clogging. It can also act as a viscosity control agent. Propylene glycol and any other suitable compound from the GRAS List that has the desired properties can be used. Ink viscosity can be tailor-made using this viscous material. Propylene glycol is preferred.

The humectant should be present in an amount from about 0.5% to about 4% by weight of the ink composition, with an amount of from about 1.0 to about 2.0 being preferred.

Other Optional Components

Other components may also be included in the ink compositions of the present invention to impart characteristics desirable for ink jet printing applications. Volume 21, Chapter 1, Part 73.1 of the CFR under "Inks for Marking Fruits and Vegetables".

The compositions of the present invention may also contain conductivity agents. If present, they are present in amounts of from about 0.2% to about 2.0%. Examples of suitable conductivity agents are food grade ammonium, sodium or potassium salts of organic acids, such as sodium acetate, potassium lactate or sodium propionate. The use of ammonium chloride as a conductive agent is preferable.

A pH control agent may also be used in the ink composition from the GRAS List to insure that the components of the ink composition remain soluble throughout the range of water and throughout the ink's stated shelf life. For this purpose, it is desirable to maintain the pH of the ink at about 7.0–10.5, e.g., about 7.5 and 10. A pH of 9.0 being optimal. The pH is dependent upon the components which are employed in the composition. Although use can be made of inorganic bases such as sodium hydroxide and potassium hydroxide, their presence in the printed character leads to poor water resistance after drying. It is preferred to make use of an organic base which can be eliminated by evaporation. Best use is made of a pH adjusting agent that evaporates rapidly to accelerate development of water resistance upon aging. Thus, use can be made of ammonium hydroxide or ammonium chloride for controlling pH within the desired range.

Typically, the pH control agent is present in an amount form about 0.10% to about 5.0% by weight of the ink composition. The optimal amount will vary depending upon the specific components of the ink composition.

The present invention may also comprise other additives, which may be any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties. Again, because the principal application of the inks of the present invention involve direct food contact, any such additional components should be appropriate for food contact uses, such as those components listed in Volume 21, Chapter 1, Part 73.1 of the CFR or Part 184 of the same volume and chapter.

It is preferred to use all components in the composition which are food grade or edible.

Manufacture

The ink compositions of the present invention can be made by conventional means. Preferably, the colorant is dissolved or dispersed in the solvent medium. The colorant may be in a dry, aqueous or other suitable solvent form. The colorant is incorporated into the solvent medium for present use using any suitable mixing technique. The colorant may also be available in the form of a particulate solid or pigment, which can be used as such for direct dissolution in the solvent medium. Many forms of suitable dyestuff, notably water soluble food grade dyestuffs, are commercially available and may be used in their commercially available purity.

All references cited herein are expressly incorporated herein in their entirety.

The following Examples are illustrative of an ink jet composition of the present invention and are not to be construed as limitations on the scope of the invention.

EXAMPLE 1

The following formulation was made by mixing the components in the order listed:

| Material | % |
| --- | --- |
| Ethyl acetate (Fisher Scientific) | 27.0 |
| Ethyl cellulose STD #4 (DOW) | 1.8 |
| SDA-3A Alcohol (Petro Products) | 49.0 |
| Shellac supplied in 50% ethanol (Bradshaw - Praeger) | 15.0 |
| FD&C Blue #1 Dye (Warner - Jenkinson) | 0.3 |
| FD&C Red #3 Dye (Warner - Jenkinson) | 1.1 |
| NH$_4$OH (Fisher Scientific) | 1.4 |
| NH$_4$Cl (5% in water solution) | 3.4 |
| Propylene Glycol (Fisher Scientific) | 1.0 |
| | 100.0 |

The ink when applied by ink jet printing to lemons was reddish brown in color and found to be storage stable after six cycles of transferring the fruit from refrigerator to room temperature, without degradation of the printed image.

EXAMPLE 2

The following formulation was made by mixing the components in the order listed:

| Material | % |
| --- | --- |
| SDA-3A 200 Proof | 81.5 |
| Ethyl Cellulose | 1.5 |
| Foral AX | 12.0 |
| FD&C Blue #1 | 0.6 |
| NH$_4$OH | 1.4 |
| NH$_4$Cl 5% solution | 2.0 |
| Propylene Glycol | 1.0 |
| Total | 100 |
| Viscosity | 3.67 |
| Resistivity | 1263 |

| Material | % |
| --- | --- |
| pH | 8.5 |

This blue ink when printed on lemons appears green. The formulation resists condensation cycles from a refrigerator to room temperature, without degradation of the printed image.

EXAMPLE 3

The following formulation was made by mixing the components in the order listed:

| Material | % |
| --- | --- |
| Ethyl Acetate | 30.8 |
| Ethylcellulose | 1.3 |
| Hercules Staybelite Ester | 4.0 |
| SDA-3A Alcohol | 37.8 |
| Shellac | 14.5 |
| FD&C Blue Dye #1 | 0.4 |
| FD&C Red Dye #3 | 0.2 |
| Ammonium Hydroxide | 0.5 |
| Ammonium Chloride (20% in water) | 1.5 |
| | 100.0 |

This blue ink when printed on lemons appears green. The formulation resists condensation cycles from a refrigerator to room temperature, without degradation of the printed image.

What is claimed is:

1. An ink composition suitable for ink jet printing onto a food item comprising a colorant, a binder and a carrier, wherein the binder comprises shellac and ethyl cellulose and the carrier comprises ethanol, the ink composition being free of methyl ethyl ketone and acetone.

2. The ink composition of claim 1, wherein the carrier also comprises methanol.

3. The ink composition of claim 1, wherein the binder comprises shellac, ethyl cellulose and wood rosin resin.

4. The ink composition of claim 1 wherein the carrier also comprises ethyl acetate.

5. The ink composition of claim 1, wherein said colorant is present in an amount from about 0.1% to about 20% by weight of said ink composition.

6. An ink composition suitable for ink jet printing onto a food item comprising a colorant, a binder and a carrier, wherein the binder comprises a wood rosin resin and the carrier comprises ethanol, the ink composition being free of methyl ethyl ketone and acetone.

7. The ink composition of claim 4, wherein the carrier also comprises methanol.

8. The ink composition of claim 4, wherein the binder comprises also comprises ethyl cellulose.

9. The ink composition of claim 5 wherein the carrier also comprises ethyl acetate.

10. The ink composition of claim 6, wherein said colorant is present in an amount from about 0.1% to about 20% by weight of said ink composition.

11. The ink composition of claim 6 which exhibits the following characteristics: (1) a viscosity from about 1 to about 10 centipoise (cps) at 25° C., (2) an electrical resistivity from about 50 to about 2,500 ohms-cm$^{-1}$, (3) a sonic velocity from about 1,000 to about 1,700 m/sec., and (4) a surface tension below 30 dynes/cm.

12. A method of printing an image on a food item comprising forming the ink of claim 1 into droplets and directing the droplets to a specific location on said item to form said image.

13. A method of printing an image on a food item comprising forming the ink of claim 6 into droplets and directing the droplets to a specific location on said item to form said image.

14. A method of printing an image on a food item comprising forming the ink of claim 10 into droplets and directing the droplets to a specific location on said item to form said image.

15. A food item having an image thereon, said image having been formed by use of ink jet printing wherein the ink is the ink of claim 1.

16. The food item of claim 15, wherein the food item is a citrus fruit.

17. A food item having an image thereon, said image having been formed by use of ink jet printing wherein the ink is the ink of claim 6.

18. The food item of claim 17, wherein the food item is a citrus fruit.

19. A food item having an image thereon, said image having been formed by use of ink jet printing wherein the ink is the ink of claim 14.

20. The food item of claim 19, wherein the food item is a citrus fruit.

* * * * *